COPPER-POLYMER LAYER BONDED ARTICLES

Filed Aug. 12, 1971

*INVENTORS*
Fritz Glander
Bernd Eilhardt
*BY* Marn & Jangarathis
*ATTORNEYS*

United States Patent Office 3,806,358

Patented Apr. 23, 1974

3,806,358
COPPER-POLYMER LAYER BONDED ARTICLES

Fritz Glander, Isernhagen, and Bernd Eilhardt, Vinnhorst, Germany, assignors to Kabel- und Metallwerke Gutehoffnungshutte A.G., Hannover, Germany Filed Aug. 12, 1971, Ser. No. 171,198
Claims priority, application Germany, Aug. 22, 1970, P 20 41 785.0
Int. Cl. B32b *15/08*, C09d *3/76*
U.S. Cl. 117—132 C 28 Claims

ABSTRACT OF THE DISCLOSURE

A composition for bonding to copper comprised of copolymers and ionic copolymers of ethylene and an α,β-monoethylenically unsaturated carboxylic acid having incorporated therein a copper deactivating amount of a copper stabilizer or deactivator. The composition has improved moisture-resistant bond strength on copper and laminates of copper and the composition may be employed as a protective sheathing for cables.

This invention relates to compositions for bonding to copper, laminates of copper and such compositions, and uses therefor.

The use of laminates formed from copper and a copolymer of ethylene and a monomer with a reactive carboxyl group have been proposed for many applications, including the shielding of telephone cables; e.g., as disclosed in U.S. Pat. 3,233,036. The use of such a copolymer was considered to be advantageous in that the copolymer was adhesively bonded to the copper thereby providing a laminate which resisted delamination.

In using such laminates, however, it was found that upon being exposed to moisture at elevated temperatures (around 70° C.), after short periods of time, the bond between such copolymers and the copper was destroyed resulting in delamination.

Accordingly, the principal object of the present invention is to provide an improved polymer composition for bonding to copper to thereby provide improved copper-polymer laminates for various applications.

The objects of this invention are broadly accomplished by providing a composition comprised of a copolymer or an ionic copolymer (ionomer) formed from ethylene and a monomer having a reactive carboxyl group (hereinafter sometimes referred to as the polymer) which has incorporated therein in addition to the usual antioxidant a copper stabilizing or deactivating amount of a copper stabilizing compound; i.e., the compound deactivates copper.

The copper stabilizer or deactivator is one which deactivates copper without preventing the formation of an effective bond between the selected copolymer or ionic copolymer, and is employed in an amount to deactivate the copper. Some copper deactivators or stabilizers have been found to decrease the absolute adhesive strength of the bond between the polymer and the copper, with an increase in the amount of stabilizer further decreasing the bond strength. The minimum desired peel strength for a copper polymer laminate should be at least about 2 kp./cm.$^2$ and, accordingly, the copper deactivator is employed in an amount to deactivate the copper and provide such minimum peel strength. The term "copper deactivating amount" as used herein defines an amount of copper which provides both the required deactivation and minimum peel strength. In general, the polymer contains from about 0.01 and about 2%, and preferably from about 0.05 to about 0.5%, all by weight, of the copper stabilizer or deactivator.

The copper deactivator may be incorporated into the polymer by any of the wide variety of methods and equipment known in the art for incorporating a stabilizer uniformly into a solid material, including mills, extruders, banbury mixers and the like. The deactivator could be added to the polymer as a solid or as a dispersion or solution in a suitable liquid. The details of uniformly dispersing the deactivator into the polymer forms no part of the present invention, and since such procedures are well known in the art, no detailed explanation is deemed necessary for a full understanding of the invention.

It is to be understood that the composition generally includes in addition to the copper deactivator or stabilizer one or more of the usual antioxidants, inhibitors and/or stabilizers to inhibit and/or stabilize the polymer against the deleterious effects of oxygen, heat, aging and the like. The antioxidant is present, as known in the art, in a concentration sufficient to inhibit oxidative attack of the polymer. The antioxidants are generally characterized by: a phenolic residue, divalent sulfur, aromatic amino residues, etc. As representative examples of such antioxidants, there may be mentioned: 4,4′-thiobis (3-methyl-6-t-butyl phenol); 6,6′-di-t-butyl-4,4′-bi-o-cresol; 2,6-di-t-butyl-4-methyl phenol; phenyl-β-naphthylamine; 5-N-pentadecyl resorcinol; 4,4′-butylidenebis- (6-t-butyl-3-methyl phenol) and the like. Antioxidants are generally used in amounts from about 0.1 to 5%, by weight, based on the polymer, although higher and lower concentrations can be employed. The use of such antioxidants is well known in the art and no further explanation is deemed necessary for a full understanding of the invention. It is also to be understood that the composition may also include other conventional components such as fillers, extenders, etc.

A laminate comprised of the polymer, including the copper stabilizer or deactivator and copper may be formed by the use of heat and pressure by any one of the wide variety of procedures known in the art. Thus, for example, the polymer including the stabilizer and the usual antioxidant may be bonded to the copper by an extrusion technique. Similarly, the polymer having the copper deactivator incorporated therein may be formed into a sheet, as known in the art, and the sheet mill pressed to the copper to produce the desired laminate. It is of course understood that, as known in the art, the copper surfaces to which the polymer is to be bonded should be suitably cleaned and degreased. The particular method of producing a laminate of copper and the polymer, including the copper deactivator, forms no part of the present invention, and since such techniques are known in the art, no detailed explanation is deemed necessary for a full understanding of the invention.

COPOLYMERS AND IONIC COPOLYMERS

The copolymers are formed from ethylene and an alpha-beta ethylenically unsaturated carboxylic acid, containing one or more carboxyl groups, preferably hydrocarbon carboxylic acids, and more preferably hydrocarbon monocarboxylic acids, in which the acid is present in an amount from about 1% to about 30%, preferably from about 4% to about 8%, all by weight. The carboxylic acid group-containing monomer preferably has from 3 to 8 carbon atoms and examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids may be employed. The preferred acid components are acrylic acid, methacrylic acid and ethacrylic acid.

The copolymer may be produced by the copolymerization of a mixture of the olefin and the carboxylic acid monomer, and such methods have been described in the literature. In a preferred process, a mixture of the two monomers is introduced into a polymerization environment maintained at high pressure, 50 to 3000 atmospheres, and elevated temperatures, 150 to 300° C., together with a free radical polymerization initiator such as a peroxide. An inert solvent for the system, such as water or benzene, may be employed, or the polymerization may be substantially a bulk polymerization.

Copolymers of ethylene with carboxylic acids may also be prepared by copolymerization of the ethylene with an $\alpha,\beta$-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer.

The copolymer need not be a two-component polymer, provided the ethylene content is at least about 70%, by weight. In general, a third component, if employed, is an alkyl ester of a carboxylic acid of the type hereinabove described with the alkyl group generally having from 1–20 carbon atoms. The preferred esters are the methyl and ethyl esters of acrylic and methacrylic acid. Suitable copolymers are: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate polymers, ethylene/methacrylic acid/ethyl acrylate copolymers, ethylene/itaconic acid/methyl methacrylate copolymers and the like.

It is also to be understood that the copolymer could be a graft copolymer prepared as known in the art; e.g., as described in U.S. Pat. No. 2,987,501.

The ionic copolymers employed in the present invention are obtained by the reaction of one of the above described copolymers with an ionizable metal compound. These ionic copolymers are well known in the art and are described in detail in U.S. Pat. 3,355,319; U.S. Pat. 3,264,272; and U.S. Pat. 3,404,134, which are hereby incorporated by reference. As disclosed in these patents, the preferred ionic copolymers are formed from alkali metals.

The preferred polymers are copolymers of ethylene and acrylic acid with and without acrylic acid ester.

The copolymers and ionic copolymers which are employed in the present invention generally have a Melt Index from about 0.2 to about 25.0 when measured by ASTM method d1238, to provide the required processing properties. As representative examples of such copolymers and ionic copolymers which are commercially available, there may be mentioned: those sold under the following marks: Lupolen KR1285 (BASF), QX2373 (Dow Chemical), Surlyn A Type 1800 and Type 1602 (du Pont).

COPPER DEACTIVATORS

The copper deactivator or stabilizer may be any one of the wide variety of copper deactivators or stabilizers which are known to deactivate copper. The copper stabilizer is preferably one which is known to have a copper deactivating effect when incorporated into polypropylene for such purposes, such deactivators generally being nitrogenous compounds. These known copper deactivators are generally characterized by one or more of the following functional groups: amide, amino, hydrazide, hydrazone, ureide, azine or mercapto.

Disalicylamides have been found to be effective copper stabilizers for the purposes of this invention and such disalicylamides may be represented by the following structure:

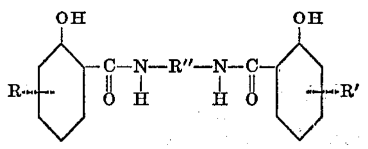

wherein:

R and R′ are radicals selected from the group consisting of alkyl, alkoxy, hydrogen and halogen and R″ is a radical selected from the group consisting of —X-and-X(NH—X)$_n$— wherein X is a 2 to 6 carbon atom alkylene radical and $n$ is a positive integer, particularly an integer from 1 to 12.

The most effective compounds for the purposes of the invention are those in which R and R′ are hydrogen, halogen, $C_1$ to $C_6$ alkyl and $C_1$ and $C_6$ alkoxy radicals.

These copper deactivators are described in detail in U.S. Pat. 3,034,879, and the teaching of this patent with respect to the copper deactivators are hereby incorporated by reference.

Compounds having the following structural formula are also suitable copper deactivators:

$$X-\overset{\displaystyle OH}{\overset{|}{A}}-CH=N-\overset{\displaystyle X'}{\overset{|}{R}}-N=CH-\overset{\displaystyle OH}{\overset{|}{A}}-X$$

in which

A is a benzene or a homo- or heterocyclic nucleus having a greater aromatic character than a benzene nucleus, e.g., a pyridine, a naphthalene or higher aromatic nucleus, the OH groups being ortho- to the —CH=N groups, R is a straight chain, branched chain or cyclic aliphatic radical or an aromatic or heterocyclic nucleus, in which the N atoms of the above general formula are preferably 1,2 or 1,3 with respect to each other, and X, X′ and X″ indicate that A and R each have one or more substituents; these substituents are such that when X″ does not include an $NO_2$ group both X and X′ must each include an $NO_2$ group and when substituents other than $NO_2$ are introduced in A or R they are such as not to detract seriously from the effects described above: substituents which satisfy this requirement are halogens. The preferred compounds of this type are 1,2-bis(3-nitro-2-hydroxybenzylidineamino)4-nitrobenzene 1,2-bis(5-nitro-2-hydroxybenzylidineamino)4-chlorobenzene 1,2-bis(5-chloro-2-hydroxybenzylidineamino)4-nitrobenzene These copper deactivators are described in more detail in U.S. Pat. 3,055,815 and the teachings of this patent with respect to the copper deactivators are hereby incorporated by reference.

Compounds of the following structural formula are also suitable copper stabilizers or deactivators:

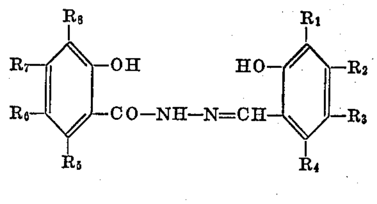

wherein $R_1$, $R_2$, $R_3$, $R_4$, $R_5$, $R_6$, $R_7$ and $R_8$ are each independently hydrogen; alkyl-, especially lower alkyl, e.g., methyl, ethyl, propyl, butyl, pentyl, hexyl-; alkoxy-, especially lower alkoxy, e.g., methoxy, ethoxy, propoxy, butoxy, pentoxy, hexoxy; or a phenyl group.

The preferred compound is N-salicylidene-N'-salicylhydrazide. These copper deactivators or stabilizers are described more fully in U.S. Pat. 3,100,696 and the teachings of this patent with respect to copper stabilizers are hereby incorporated by reference.

Hydrazones are also suitable copper stabilizers for the purposes of this invention. Thus, for example, the hydrazones represented by the following structural formula are suitable deactivators:

$$Ar-CH=N-NH-\overset{O}{\overset{\|}{C}}-Ar'$$

wherein Ar is selected from

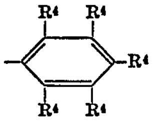

and radicals wherein one or more of the —CR⁴=groups of the above-referred-to radical have been replaced by a corresponding number of —N=group, Ar¹ is selected from

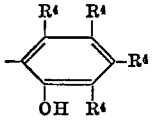

and radicals wherein one or more of the —CR⁴=groups of the

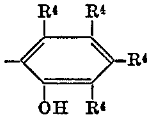

radical have been replaced by a corresponding number of —N=groups, further characterized in that at least one heterocyclic nitrogen atom and preferably less than three are present in the hydrazone compound. $R^4$ is selected from hydrocarbon radicals, hydroxy groups, halide atoms and hydrogen atoms. The hydrocarbon radicals include aliphatic, cycloaliphatic aromatic, aliphatic-aromatic, and may be saturated or unsaturated, preferably hydrocarbon radicals having up to 10 carbon atoms. Ar or $Ar^1$ may also be condensed nuclei, such as naphthyl.

Examples of hydrazones of this formula are the following:

2-methyl-benzaldehyde 3-hydroxy-5-methylisonicotinoylhydrazone;
2-chloro-4-methylbenzaldehyde 3-hydroxyisonicotinoylhydrazone;
2-ethyl-4-hydroxybenzaldehyde 4-hydroxynicotinoylhydrazone;
2-hydroxybenzaldehyde 3-hydroxyisonicotinoylhydrazone;
2,6-dihydroxy-4-chlorobenzaldehyde 3,5-dihydroxyisonicotinoylhydrazone;
4-hydroxybenzaldehyde 3-hydroxyisonicotinoylhydrazone;
2,4-hydroxybenzaldehyde 3,5-di-tert-butyl-benzaldehyde 2-tert-butyl-3-hydroxyisonicotinoylhydrazone;
2-hydroxybenzaldehyde 3-hydroxy-2-pyrazinecarboxyloylhydrazone;
4-chlorobenzaldehyde 3-hydroxynicotinoylhydrazone;
pyridine-4-carboxyaldehyde 2-hydroxynicotinoylhydrazone;
3-hydroxypyridine-3-carboxaldehyde 3-hydroxyisonicotinoylhydrazone;
3-hydroxypyridine-4-carboxaldehyde salicyloylhydrazone; and
3-hydroxy-5-methylpyridine-4-carboxaldehyde salicyloylhydrazone.

A preferred hydrazone is hydroxybenzaldehyde 3-hydroxyisonicotinoylhydrazone of the formula

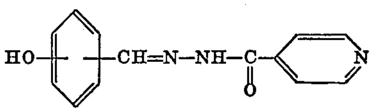

These hydrazones are described in some detail in U.S. Pat. 3,296,188 and the teachings of this patent with respect to hydrazones as copper stabilizers are hereby incorporated by reference.

Hydrazones represented by the following structural formula are also suitable deactivators.

$$Ar'-CH=N-NH-\overset{O}{\overset{\|}{C}}-Ar^1$$

wherein $Ar^1$ represents

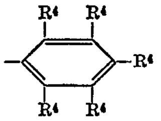

wherein $R^4$ is a member selected from hydrocarbon radicals, a hydroxy group, a halide atom and a hydrogen atom with the proviso that at least one $R^4$ of the hydrazone is a hydroxy group and preferably attached to the ring in the ortho position, i.e.,

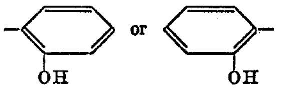

The hydrocarbon radicals include aliphatic, cycloaliphatic, aromatic and aliphatic aromatic radicals and may be saturated or unsaturated. Examples of suitable hydrocarbon radicals are those having up to 10 carbon atoms, such as methyl, ethyl, propyl, isopropyl, butyl, tert-butyl, norbornyl, isobornyl, cyclohexyl, vinyl, phenyl, benzyl, tolyl and the like. Ar and $Ar^1$ may also be condensed nuclei such as naphthyl.

Representative hydrazones are the following:

2-methylbenzaldehyde 4-methylsalicyloylhydrazone;
2-chloro-4-methylbenzaldehyde 6-ethylsalicyloylhydrazone;
2-ethyl-4-hydroxybenzaldehyde 6-ethylsalicyloylhydrazone;
2-hydroxy-4-butylbenzaldehyde 4,5-dimethylsalicyoylhydrazone;
2,6-diethyl-4-chlorobenzaldehyde 4-vinylsalicyloylhydrazone;
2-hydroxy-4,6-dimethylbenzaldehyde 6-hydroxysalicyoylhydrazone;
3-hydroxybenzaldehyde salicyloylhydrazone;
4-hydroxybenzaldehyde salicyloylhydrazone;
2-methyl-4-hydroxybenzaldehyde salicyloylhydrazone and the like.

The preferred hydrazone of this type is hydroxybenzaldehyde salicyloylhydrazone of the formula

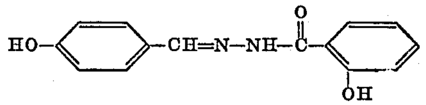

These hydrazones are described in more detail in U.S. Pat. 3,438,935, and the teachings of this patent with respect to these stabilizers are hereby incorporated by reference.

Hydrazones having the following structural formula are also suitable stabilizers:

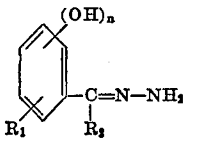

wherein $R_1$ and $R_2$ are hydrogen or same or different hydrocarbon radicals which are substituted or unsubstituted alkyl, cycloalkyl, aryl, alkaryl or aralkyl radicals and *n* is 1 or 2.

As representative hydrazone compounds which are encompassed by this formula, there are mentioned:

2-hydroxyacetophenone hydrazone,
2,4-dihydroxyacetophenone hydrazone,
salicylaldehyde hydrazone,
2-hydroxycaprophenone hydrazone,
2-hydroxydodecaphenone hydrazone,
2,4-dihydroxybenzaldehyde hydrazone, and
2,4-dihydroxybutyrophenone hydrazone.

These hydrazone copper deactivators are described in U.S. Pat. 3,407,173, and the teachings of this patent, with respect to such deactivators or stabilizers, are hereby incorporated by reference.

Azine compounds are also suitable copper stabilizers for the purposes of this invention. Azine compounds having the following structural formula are particularly suitable.

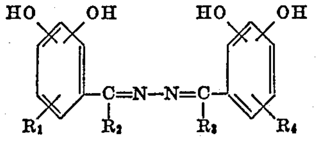

wherein $R_1$, $R_2$, $R_3$ and $R_4$ are hydrogen or same or different hydrocarbon radicals which are substituted or unsubstituted alkyl, cycloalkyl, aryl, alkaryl or aralkyl radicals.

As representative compounds, there may be mentioned 2,4-dihydroxyacetophenone azine, 2,4-dihydroxyoctaphenone azine, 2,4-dihydroxypropiophenone azine, 2,4-dihydroxybutyrophenone azine, 2,4 - dihydroxycaprophenone azine and 2,4-dihydroxydodecanophenone azine.

Azine compounds useful as copper stabilizers are described in U.S. Pat. 3,407,174, and the teachings of this patent, with respect to such stabilizers, are hereby incorporated by reference.

Hydrazide compounds are also suitable copper deactivators or stabilizers for the purposes of this invention. Hydrazide deactivators which are derivatives of the radical $$-\overset{O}{\overset{\|}{C}}-\overset{H}{\overset{|}{N}}-NH_2$$

are disclosed in U.S. Pat. 3,484,285, in particular benzhydrazide, isonicotinic acid hydrazide, *p* - nitrobenzhydrazide, m-nitrobenzhydrazide, salicyl hydrazide, maleic acid hydrazide, and oxalyl dihydrazide, and such hydrazides are suitable for the purposes of this invention. The teachings of U.S. Pat. 3,484,285, with respect to such copper stabilizers, are hereby incorporated by reference.

Oxalhydrazides having the following formula are suitable for the purposes of this invention:

$$\begin{array}{l} O{=}C{-}NH{-}NHR \\ \quad | \\ O{=}C{-}NH{-}NHR \end{array}$$

where R is selected from the alkyl radicals having 1 to 16 carbon atoms, the mono-aryl radicals and the naphthene radicals having 5 to 12 carbon atoms. Representative hydrazides within this formula are: oxaldihydrazide, bis - cyclohexanoneoxaldihydrazide, tetramethyloxaldihydrazide, diphenyloxaldihydrazide, tetralauryloxaldihydrazide, dilauryloxaldihydrazide, dibutyloxaldihydrazide, dimethyldiphenyloxaldihydrazide, and biscycloheptanoneoxaldihydrazide. These oxaldihydrazide copper stabilizers are disclosed in U.S. Pat. 3,117,104, and the teachings of this patent, with respect to copper deactivators, are hereby incorporated by reference.

Oxalyl dihydrazides having the following formula are also suitable for purposes of this invention:

$$\begin{array}{l} O{=}C{-}NH{-}N{=}A \\ \quad | \\ O{=}C{-}NH{-}N{=}B \end{array}$$

wherein A and B are selected from the group consisting of:

(a) $H_2$, and
(b) benzyl type radicals having the following structure:

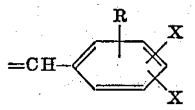

wherein R is a monovalent radical selected from the group consisting of hydrogen, alkyl (1–20 carbon atoms, preferably lower alkyl, 1–4 carbon atoms), and alkoxyl (1–20 carbon atoms, preferably lower alkoxy, 1–4 carbon atoms), and X is selected from the group consisting of hydrogen and the halogens; and at most one of A and B is $H_2$.

The preferred compounds are N,N'-dibenzal - (oxalyl dihydrazide) and N-benzal oxalyl dihydrazide, with the former being particularly preferred. These deactivators are described in U.S. Pat. 3,440,210, and the teachings of this patent, with respect to such stabilizers, are hereby incorporated by reference.

Hydraxides having the following structural formula are also suitable for the purposes of this invention.

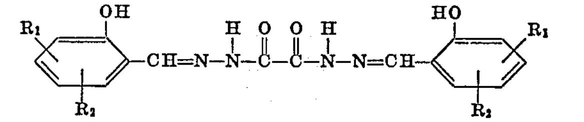

in which each of $R_1$ and $R_2$ is hydrogen, alkyl, chloro, phenyl, or, taken together, benzo.

Particularly valuable compounds embraced by this formula include compounds of the formula:

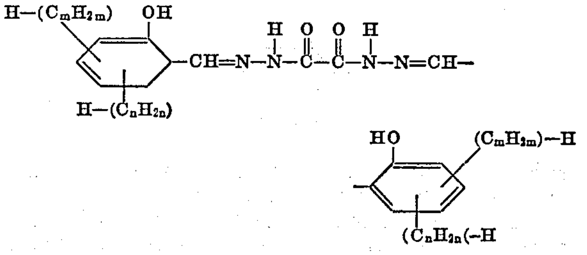

in which each of *n* and *m* is an integer from 0 to 20. Thus included are compounds of the following three formulae:

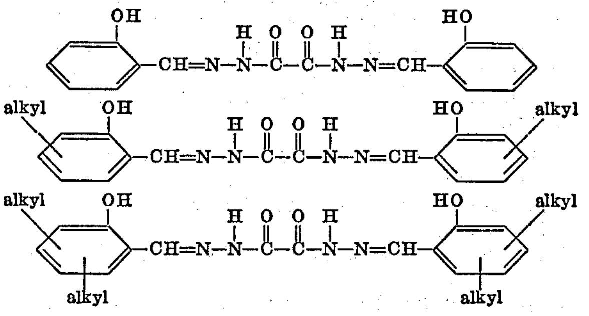

Representative compounds are oxalo-bis-(salicylidenehydrazide),
oxalo-bis-(2-hydroxy-5-octadecylbenzylidenehydrazide),
oxalo-bis-(2-hydroxy-5-methylbenzylidenehydrazide),
oxalo-bis-(2-hydroxy-5-t-butylbenzylidenehydrazide),
oxalo-bis-(2-hydroxy-3,6-dimethylbenzylidenehydrazide),
oxalo-bis-(2-hydroxy-5-t-amylbenzylidenehydrazide),
oxalo-bis-((2-hydroxy-3,5-di-t-butylbenzylidenehydrazide),
oxalo-bis-(hydroxy-5-phenylbenzylidenehydrazide),
oxalo-bis-(2-hydroxy-5-chlorobenzylidenehydrazide) and
oxalo-bis-(2-hydroxy-1-naphthylidenehydrazide).

These copper deactivators are described in more detail in U.S. Pat. 3,357,944, and the teachings of this patent, with respect to such deactivators, are hereby incorporated by reference.

Oxamide and derivatives of oxamides which contain the radical

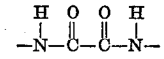

are also suitable copper stabilizers. The term derivatives includes polymers containing the noted radical. In particular, the derivatives having one of the following general formulae:

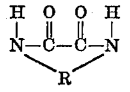

where R is either an ethylene or a keto group; and derivatives of oxamide having the general formula:

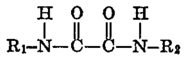

where $R_1$ and $R_2$ are cyclic radicals, $R_1$ and $R_2$ may be the same or different. They may be homocyclic, heterocyclic, aromatic or polycyclic and may have 4–6 carbon atoms in each cyclic ring. R, $R_1$ and $R_2$ may be substituted or unsubstituted. The preferred components are N,N′-diphenyloxamide and polyhexamethylene oxamide. Representative examples of such oxamide compounds are given in U.S. Pat. 3,462,517, and the teachings of this patent, as related to oxamide copper stabilizers, are hereby incorporated by reference.

Other oxamide copper deactivators which are suitable for the purposes of this invention are those represented by the following structural formula:

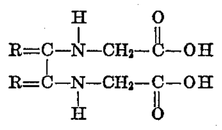

wherein each R is a radical independently selected from the group consisting of O and S radicals.

Representative examples of such oxamide compounds are given in U.S. Pat. 3,160,680, and the teachings of this patent, as related to oxamide copper stabilizers, are hereby incorporated by reference.

Mercapto and thio hydrazides and/or ureides having the following structures are also suitable copper stabilizers:

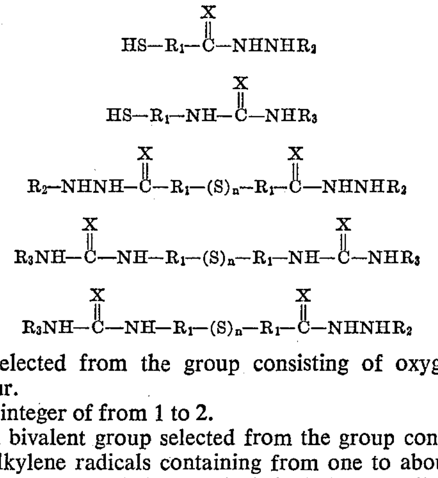

X is selected from the group consisting of oxygen or sulfur.

*n* is an integer of from 1 to 2.

$R_1$ is a bivalent group selected from the group consisting of alkylene radicals containing from one to about two carbon atoms; alkylene radicals including an alkyl substituent having from one to about twelve carbon atoms; aryl having from six to about ten carbon atoms, hydroxyl; and halogen groups, and arylene radicals containing from about six to about ten carbon atoms; and such radicals including the substituents named above, nitro and alkoxy having from one to about twelve carbon atoms.

$R_2$ is selected from the group consisting of hydrogen, alkyl having from one to about twelve carbon atoms, aryl having from six to about ten carbon atoms, and alkaryl and aralkyl having from seven to about ten carbon atoms, and such radicals including any of the above substituents, and mercapto,

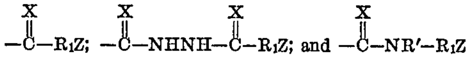

wherein Z is selected from the group consisting of hydrogen, hydroxyl and mercapto groups; and R′ is selected from the group consisting of hydrogen and alkyl radicals having from one to about four carbon atoms, and X and $R_1$ are as defined above; and $R_3$ is selected from the group consisting of hydrogen,

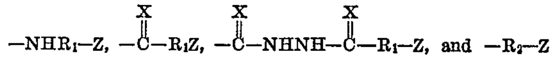

wherein Z, $R_1$ and R′ are as defined hereinbefore.

In each of the above structures, the R's and X's in the same compound may be the same or different.

The halogen can be chlorine, bromine or iodine.

Where the $R_1$ arylene group is linked to a sulfur atom and/or a

group, the sulfur atom and the

group are ortho to each other or to a substituent on the aromatic nucleus.

These copper deactivators, and representative examples thereof, are disclosed in more detail in U.S. Pat. 3,549,572, the teachings of which, as related to such deactivators, are hereby incorporated by reference.

Further suitable are amino-compounds which may be used are for instance amines of boiling point greater than about 200° C., for example; mono-primary amines—n-nonylamine, decylamine, dodecylamine, hexadecylamine, octadecylamine, docosylamine, p-toluidine, 2-amino-p-xylene, 4-amino-m-xylene, o-, m- and p-anisidines, o-, m- and p-phenetidines, o-, m- and p-chloro-anilines, o-, m- and p-bromoanilines, mesidine, 1-cumidine, 4-amino-3-bromotoluene, p-benzylaniline, methyl anthranilate, ethyl anthranilate, α-naphthylamine, ac- and ar-tetrahydro-α-naphthylamine, β-naphthylamine, ac- and ar-tetrahydro-β-naphthylamines, 4-aminodiphenyl, p-aminoacetophenone, p-amino-benzophenone, benzohydrylamine, m- and p-amino-benzophenone, benzohydrylamine, m- and p-amino triphenylmethanes; diprimary amines (which may also contain secondary amine or ether groups)—hexamethylene diamine, decamethylene diamine, dodecamethylene diamine, γ,γ′-diaminodipropyl ether, 1,6-di(-aminopropoxy) hexane, tri(ethylene glycol) diamine, tetra (ethylene glycol) diamine, diethylene triamine, triethylene tetramine, p-di(β-amino-ethoxy) benzene, bis(p-aminobenzyl), 1,6-di(j-aminophenyl) hexane, 2,4′-diaminodiphenyl, p,p″-diaminodiphenyl methane, 2,2-bis(4-aminophenyl) propane, p,p′-di-aminomethyl phenyl ether, 1,2-di(4′-aminophenoxy) ethane, o-, m- and p-phenylene diamines, the various tolylene diamines e.g. 2,4- and 2,6-tolylene diamines; the various diaminoxylenes for instance 1,3-dimethyl-4,6-diaminobenzene, 1,2-dimethyl-3,5-diaminobenzene; 1-ethyl-2,4-diaminobenzene, 1-ethyl 3,5-diamino benzene, 1-ethyl-2,6-diamino benzene, 1,4-di-(β-aminoethoxy) cyclohexane, 1,2-di(4′-aminocyclohexyl) ethane, 4,4′-diaminodicyclohexyl methane, 1,6-di(4′-aminocyclohexyl) hexane, 2,4′-diamino dicyclohexyl, 2,2-bis(4′-aminocyclohexyl) propane; mono- and di-secondary amines formed from any of the above by the replacement of one hydrogen of one or more primary amino groups by an aliphatic or arylaliphatic, e.g. alkyl, cycloalkyl, hydroxyalkyl, acyloxyalkyl or aralykyl group may also be used; other secondary amines of boiling point at least 200° C. for example diethanolamine, decahydroquinoline, dicyclohexylamine or diisooctylamine may also be used. Although diarylamines do not fall within this disclosure, their amino-derivatives, e.g. p-aminodiphenylamine and p,p'-diaminodiphenylamine may be used.

These amino compounds are generally used in conjunction with a phenolic antioxidant and optionally also an organic sulfur compound. These copper deactivators are described in U.S. Pat. 3,181,971 which is hereby incorporated by reference.

Other suitable copper stabilizers are azimidobenzene and derivatives of azimidobenzene which include the radical:

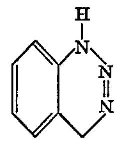

and the corresponding compounls having as ix membered heterocyclic ring characterized by the phenotriazine structure:

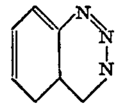

Representative compounds include azimidobenzene, 5-chloroazimidobenzene, 5-methylazimidobenzene, 5-nitroazimidobenzene, 5,6-dimethylazimidobenzene, 1,2-azimidonaphthalene and 4-hydroxy phenotriazine. Such copper stabilizers or deactivators are described in more detail in U.S. Pat. 3,367,907, the teachings of which, as related to these copper stabilizers or deactivators, are hereby incorporated by reference.

Other suitable copper stabilizers or deactivators include triazine, triazoles, including 3-amino-1,2,4-triazole, triazolines and tetrazoles as described by Hansen et al., Polymer Eng. and Science, vol. 5, October 1965, pages 223–226; 2,3-dihydroxyquinoxaline, as described in U.S. Pat. 3,425,984; the various heterocyclic hydrazines and lactams, described in German Offenlegungsschrift 1,927,-447, the teachings of which with respect to copper stabilizers being hereby incorporated by reference; the various heterocyclic amines and amides described in German Offenlegungsschrift 1,926,547, the teachings of which, as related to copper stabilizers or capacitors, being hereby incorporated by reference. It is also to be understood that in some cases two or more components or mixtures of known deactivators are employed to obtain the deactivating effect and the term copper stabilizer or deactivator includes such two or more components. Thus, for example, U.S. Pat. 3,560,434, U.S. Pat. 3,535,257, British patent specification 890,761 and British patent specification 951,-931 describe copper deactivators comprised of more than one component and the teachings of these patents are also incorporated by reference.

The preferred copper stabilizers or deactivators are: N,N' - diphenyloxamide, oxaldihydrazide, nitrobenzhydrazide, 3-amino-1,2,4-triazole, polyhexamethyleneoxamide and N-salicylidene-N'-salicyloyl hydrazine.

It is to be understood that the hereinabove copper stabilizers or deactivators are representative examples of such stabilizers or deactivators are not to be considered as limiting the overall scope of the invention.

The copper laminates of the present invention have a wide variety of uses and some of such uses will be described with reference to the accompanying drawings, wherein.

Figure 1:
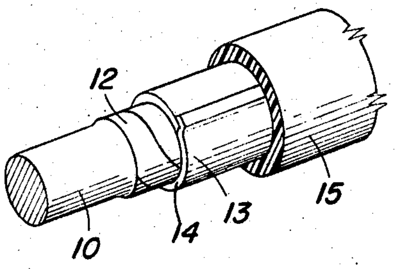
FIG. 1 is a simplified representations of a cable including a laminate of the present invention.

The laminates of the present invention can be used, as known in the art, as a water-tight cable sheathing for transmission cables. Referring to FIG. 1, there is shown the transmission cable strands forming the cable core 10 held together, as known in the art, by a winding 12 of paper, plastic or other suitable material. A water-tight cable sheathing of a preformed laminate of the present invention comprised of a copper band 14 having bonded to one or both of its surfaces a layer 13 of a copolymer or ionic copolymer, including a copper stabilizer or deactivator is wound above and around the winding 12. An outer plastic coating 15, such as polyethylene, surrounds the cable sheathing. The copper band 14 having the layer 13 bonded thereto is longitudinally placed around the cable core with a small overlap and the plastic coating 15 is extruded thereon. The heat of extrusion is sufficient to bond together the laminate of the copper band 14 and layer 13 at the overlap and to also establish a firm bond between the band 14 and the sheathing 15.

The production of such cables is generally known in the art (e.g., U.S. Pat. 3,206,541; U.S. Pat. 3,233,036; and U.S. Pat. 3,459,877) and such teachings are especially applicable to the production of cables including a copper-polymer laminate of the present invention.

Figure 2:
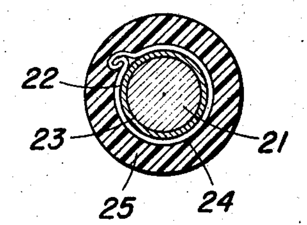
FIG. 2 is a simplified representation of another cable including a laminate of the present invention.

Referring to FIG. 2, there is illustrated an alternate method of providing a transmission cable having a water-tight cable sheathing formed of a copper laminate of the present invention. In accordance with the embodiment of FIG. 2, the cable core 21 is surrounded by a suitable winding 22 and then by copper foil 23 placed lengthwise around the core. The edges of the copper foil 23 are bent upwards, welded and then folded, as shown. Alternatively, the band edges of the copper foil 23 could be welded. After providing the welded copper foil layer 23, a layer 24 of a copolymer or ionic copolymer, including a copper stabilizer or deactivator, of the present invention, is extruded over and bonded to the copper foil layer 23 to provide a water-tight sheathing.

The outer plastic sheathing 25 is then formed as known in the art.

The laminates of the present invention can also be used to advantage to provide transmission cables with damping dependent on frequency. In accordance with the present invention, the massive inner core is replaced by a laminate of the present invention comprised of an inner member formed of a copolymer or ionic copolymer including a copper stabilizer of the present invention, and a copper foil outer member bonded to the inner member.

Figure 3:
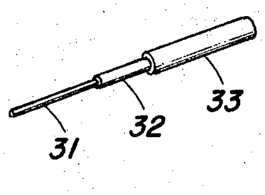
FIG. 3 is a simplified representation of a transmission cable formed from a laminate of the present invention.

Referring to FIG. 3, there is shown a solid inner member 31 formed from a copolymer or ionic copolymer having incorporated therein a copper stabilizer, as hereinabove described, surrounded lengthwise by a thin copper band 32. The copper band is heated and forced under pressure over the inner member 31 to form an adhesive bond therebetween. The edges of the copper band 32 are, for example, welded along the longitudinal seam. A plastic coating 33, as known in the art, is extruded over the copper band 32. Accordingly, the massive inner core has been replaced with a thin copper tube and through the skin effect, all of the energy transmitted is through the copper layer 32.

Figure 4:
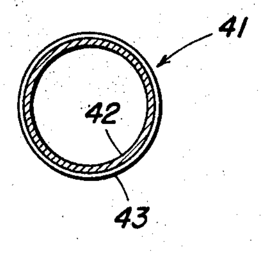
FIG. 4 is a simplified representation of a pipe formed from a laminate of the present invention.

The laminates of the present invention may also be used for producing pipe for the transportation of various materials, including heated or refrigerated, liquid or gaseous media. Thus, as shown in FIG. 4, a pipe 41 is comprised of a copper tube 42 having bonded to its exterior surface a layer 43 of a copolymer or ionic copolymer including a copper stabilizer, of the present invention. The copper tube 42 may be preformed and the layer 43 subsequently bonded thereto, for example, by an extrusion technique. Alternatively, copper sheets having one or both surfaces covered with the copolymer or ionic copolymer, including a copper deactivator, of the present invention bonded thereto may be formed with the edges thereof free of the polymer layer. The tube is then formed from the copper laminate, and the polymer free edges welded together.

It is also to be understood that the copolymer and/or ionic copolymer including a copper stabilizer or deactivator may be used for bonding together copper surfaces. Thus, for example, the composition may be used between an overlapping seam portion of a copper strip in which case the composition functions as an adhesive for providing an effective bond.

The invention is further illustrated by the following examples, but it is to be understood that the scope of the invention is not to be limited thereby.

EXAMPLE I

An ethylene-acrylic acid-copolymer further including acrylate units, sold under the Lupolen mark KR–1285 by BASF was uniformly mixed with the copper stabilizer N-salicylidene-N′ salicyloyl hydrazide (CHEL–180) in amounts of 0.2% and 0.5%, by weight. A layer 1.5 mm. thick was applied to a previously degreased sheet of copper with a thickness of 0.28 mm. by application of a pressure of about 200 atm. at 180° F.

A similar sheet was also prepared from Lupolen KR–1285 without stabilizer.

The initial peel strength was about 9 kp./cm. and the initial peel strength of the 0.2% and 0.5% deactivated polymers were about 4 kp./cm. and 2 kp./cm. respectively.

The strips were kept in distilled water at 70° C. inside a drying cabinet.

The laminate strips without stabilizer exhibited a very dramatic decrease in adhesive strength which completely deteriorated after 13–15 days.

The laminate strips with stabilizer did not exhibit any notable decrease in peel strength over a period of 90 days.

EXAMPLES II–VI

In the following examples, a copper laminate is prepared, as in Example I, having a total thickness of 0.4 mm., with the thickness of the polymer layer being 0.04 mm. The resulting laminates are found to resist delamination.

EXAMPLES II-VI

| | Polymer | Antioxidant (0.5 wt. percent) | Deactivator (0.4 wt. percent) |
|---|---|---|---|
| II | Ethylene-acrylic acid (QX2373 sold by Dow). | 4,4′-thiobis (3-methyl-6-t-butylphenol). | N,N′-diphenyl oxamide. |
| III | do | do | Oxalyl dihydrazide. |
| IV | do | do | Nitrobenzhydrazide. |
| V | do | do | Poly (hexamethylene oxamide). |
| VI | do | do | 3-amino-1,2,4-triazole. |

EXAMPLES VII–XII

Copper laminates are prepared, as in Example 1, using Surlyn 1800 (an ethylene-carboxylic acid ionomer containing zinc as the major cation and including an antioxidant) as the polymer and 0.4 wt. percent of the copper deactivators of Examples I–VI.

The laminates have a total thickness of 0.4 mm., with the thickness of the polymer layer being 0.04 mm. The resulting laminates are found to resist delamination.

The present invention is particularly advantageous in that the polymeric composition may be effectively bonded to copper, and the resulting laminate, resists delamination even at those conditions at which delamination is to be expected. The results of this invention are particularly surprsing in that the polymers of the composition are not known to be susceptible to degradation by copper and, accordingly, the resulting resistance to delamination, resulting from the use of copper stabilizers or deactivators, is completely unexpected.

The present invention is further advantageous in that the polymer composition can also function as an adhesive for bonding other plastics to copper.

Numerous modifications and variations of the present invention are possible and, therefore, within the scope of the appended claims the invention may be practiced other than as described.

What is claimed is:

1. An article comprising: copper having a polymer layer bonded thereto, said polymer being a copolymer or ionic copolymer of ethylene and an $\alpha,\beta$-monoethylenically unsaturated hydrocarbon carboxylic acid, said polymer layer containing a copper deactivating amount of a copper stabilizer.

2. The article of claim 1 wherein the polymer layer contains from about 0.01 to about 2 percent, by weight of the copper stabilizer.

3. The article of claim 1 wherein the polymer is a copolymer of an $\alpha,\beta$-monoethylenically unsaturated hydrocarbon carboxylic acid and ethylene.

4. The article of claim 3 wherein the carboxylic acid is a hydrocarbon monocarboxylic acid having from 3 to 8 carbon atoms, said carboxylic acid comprising from about 1% to about 30%, by weight, of the polymer.

5. The article of claim 4 wherein the carboxylic acid is acrylic acid.

6. The article of claim 4 wherein the carboxylic acid is methacrylic acid.

7. The article of claim 4 wherein the carboxylic acid is ethacrylic acid.

8. The article of claim 4 wherein the copper stabilizer is selected from the group consisting of N,N′-diphenyloxamide, oxaldihydrazide, nitrobenzhydrazide, 3-amino-1,2,4-triazole, polyhexamethyleneoxamide and N-salicylidene-N′-salicyloyl hydrazine.

9. The article of claim 8 wherein the polymer layer contains from about 0.01 to about 2 percent, by weight, of the copper stabilizer.

10. The article of claim 8 wherein the polymer layer contains from about 0.05 to about 0.5 percent, by weight, of the copper stabilizer.

11. The article of claim 8 wherein the copper stabilizer is N,N′-diphenyloxamide.

12. The article of claim 11 wherein the carboxylic acid is acrylic acid.

13. The article of claim 8 wherein the copper stabilizer is oxaldihydrazide.

14. The article of claim 13 wherein the carboxylic acid is acrylic acid.

15. The article of claim 8 wherein the copper stabilizer is nitrobenzhydrazide.

16. The article of claim 15 wherein the carboxylic acid is acrylic acid.

17. The article of claim 8 wherein the copper stabilizer is 3-amino-1,2,4-triazole.

18. The article of claim 17 wherein the carboxylic acid is acrylic acid.

19. The article of claim 8 wherein the copper stabilizer is polyhexamethyleneoxamide.

20. The article of claim 19 wherein the carboxylic acid is acrylic acid.

21. The article of claim 8 wherein the copper stabilizer is N-salicylidene-N′-salicyloyl hydrazine.

22. The article of claim 21 wherein the carboxylic acid is acrylic acid.

23. The article of claim 1 wherein the polymer is an ionic copolymer of an α,β-monoethylenically unsaturated hydrocarbon carboxylic acid and ethylene.

24. The article of claim 23 wherein the carboxylic acid is a hydrocarbon monocarboxylic acid having from 3 to 8 carbon atoms, said carboxylic acid comprising from about 1% to about 30%, by weight, of the polymer.

25. The article of claim 24 wherein the copper stabilizer is selected from the group consisting of N,N′-diphenyloxamide, oxaldihydrazide, nitrobenzhydrazide, 3-amino-1,2,4-triazole, polyhexamethyleneoxamide and N-salicylidene-N′-salicyloyl hydrazine.

26. The article of claim 25 wherein the carboxylic acid is acrylic acid.

27. A transmission cable including a water-tight sheathing for the cable core, said water tight sheathing being formed of copper having a polymer layer bonded thereto, the polymer being a copolymer or ionic copolymer of ethylene and an α,β-monoethylenically unsaturated hydrocarbon carboxylic acid, said polymer layer containing a copper deactivating amount of a copper stabilizer.

28. A transmission cable including a cable core, said core being formed of copper having a polymer layer bonded thereto, the polymer being a copolymer or ionic copolymer of ethylene and an α,β-monoethylenically unsaturated hydrocarbon carboxylic acid, said polymer layer containing a copper deactivating amount of a copper stabilizer.

References Cited

UNITED STATES PATENTS

| | | | |
|---|---|---|---|
| 3,338,739 | 8/1967 | Rees | 117—232 UX |
| 3,233,036 | 2/1966 | Jachimowicz | 174—107 |
| 3,681,515 | 8/1972 | Mildner | 174—107 |
| 3,459,877 | 8/1969 | Bullock et al. | 174—107 |
| 3,034,879 | 5/1962 | Spacht | 44—71 |
| 3,055,815 | 9/1962 | Lyons | 204—154 |
| 3,211,808 | 10/1965 | Young et al. | 174—110 UX |
| 3,440,212 | 4/1969 | Tholstrup | 174—110 UX |
| 2,646,822 | 7/1953 | Ferguson | 138—145 X |
| 3,313,761 | 4/1967 | Barnes et al. | 117—232 X |
| 3,342,637 | 9/1967 | Jaffe | 117—232 |

OTHER REFERENCES

Modern Plastics Encyclopedia, vol. 35, No. 1–A, p. 179 (1957).

Insulation Circuits, vol. 16, No. 7, June 1970, pp. 151–152.

WILLIAM D. MARTIN, Primary Examiner

H. J. GWINNELL, Assistant Examiner

U.S. Cl. X.R.

117—94, 161 UH, 232; 138—145; 161—175, 216; 174—110 PM